…

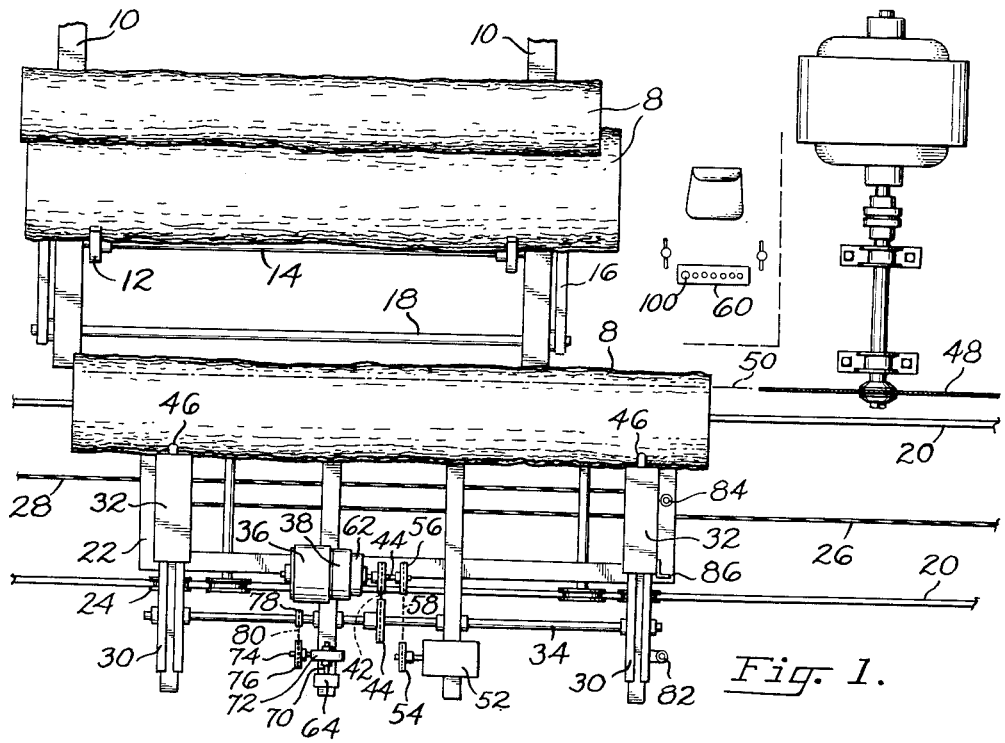
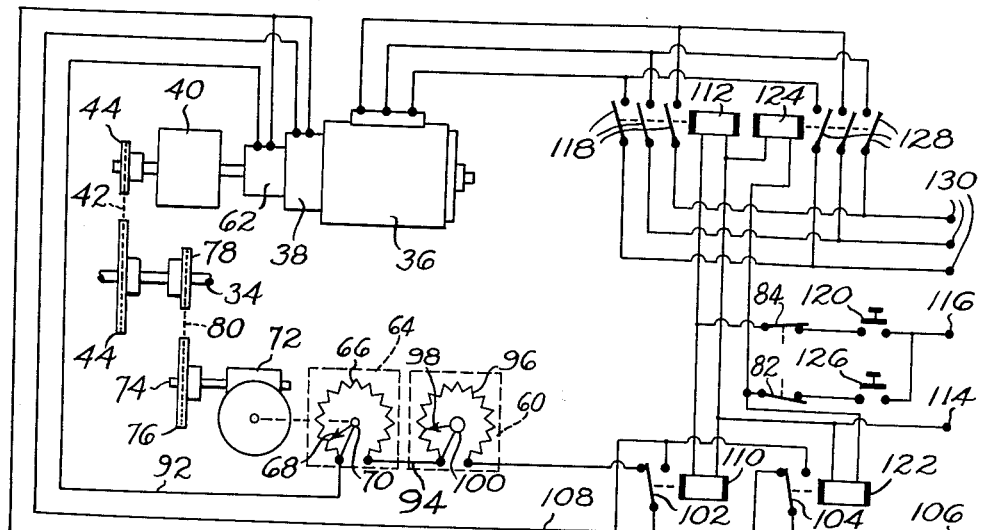

United States Patent Office 2,985,282
Patented May 23, 1961

2,985,282

AUTOMATIC TORQUE CONTROL FOR ELECTRIC BRAKES

Bernard C. T. Elworthy, Vancouver, British Columbia, Canada, assignor to Elmer R. Worth, Sr., Salem, Oreg.

Filed June 19, 1957, Ser. No. 666,715

2 Claims. (Cl. 198—221)

This invention pertains to controls for electric brakes, and relates particularly to a control for adjusting the braking torque of an electric brake automatically in accordance with a predetermined mode of operation of the brake.

There are many types of machines in which the fundamental basis of operation involves the relative adjustment of a work support and a cooperating work tool. In some machines this adjustment is afforded by movement of the work support relative to a fixed work tool, while in other machines the work tool is adjustable with respect to a fixed work support. Still other machines provide for movement of both the work support and the work tool. Such movement of working parts may be achieved by angular rotation or linear movement of a driven shaft. In any case, it is required that proper control be afforded to arrest such movement precisely when the work support and work tool have reached a specified position relative to each other.

In many of the above machines, the movable part is driven by a power motor, and the stopping of the movable part requires the use of an external brake which is arranged for actuation immediately upon the de-energization of the power source. However, there is quite often interjected into the moving system of the machine certain variables which affect the movement and stopping of the movable parts. Such variables include the power characteristics of the prime mover, the friction involved in the movable system, and the mass of an object being moved.

Illustrative of the foregoing types of machines and their manner of operation is a sawmill carriage and saw assembly, the construction and operation of which briefly is as follows: The carriage is a wheeled framework supported on spaced rails which guide the carriage back and forth past a power-driven saw. The carriage includes a plurality of spaced head blocks upon which to support a log. Retractable dogs secure the log releasably in abutment with knees which are mounted slidably upon the head blocks and are coupled to a power driven set shaft through lead screws or knee chains. By selective rotation of the set shaft, as controlled by the operator, the knees and hence the log are moved forward or rearward with respect to the plane of the saw.

Selective control of the set shaft is achieved by means of setworks, many types of which are well-known in the art. It is by means of such setworks that a log may be moved, by operation of the set shaft and its drive motor, a predetermined distance relative to the plane of a saw, to provide for the cutting of a desired thickness of wood from the log. However, inaccurate movements of the log are obtained when logs of different sizes are being operated upon. These inaccuracies are believed to result from variations in friction and inertia presented to the drive assembly and to the braking mechanism associated therewith. Specifically, in a sawmill carriage system wherein the set shaft is driven by an electric motor which, upon de-energization is braked by a direct current electric brake, it has been observed that undersetting occurs with large logs and oversetting occurs with smaller logs.

Accordingly, it is a principal object of the present invention to provide means by which to adjust the braking capacity of an electric brake automatically as the distance between relatively movable parts associated with said brake is varied between predetermined limits.

Another important object of this invention is to provide, in a system wherein one part is movable with respect to a reference point and therein braking of said movable part is controlled by an electric brake, means in combination with said brake to adjust the braking capacity of the latter automatically as the distance is varied between the said movable part and said reference point.

A further specific object of this invention is to provide in a sawmill carriage set shaft assembly which includes reciprocative knees driven by a set shaft which is controlled by a power motor and an electric brake, means in combination with said electric brake and operated by said set shaft assembly to adjust the braking torque of said electric brake automatically and in inverse proportion with respect to the distance of the knees from the plane of a saw.

The foregoing and other objects and advantages of this invention will appear from the following detailed description, taken in connection with the accompanying drawing, in which:

Figure 1 is a fragmentary plan view of a sawmill carriage assembly having incorporated therewith a brake control embodying the features of the present invention; and Figure 2 is a schematic diagram of an electric circuit for the brake control of the present invention.

Referring to Figure 1 of the drawing, there is shown for purposes of illustration the general details of one form of conventional sawmill. The sawmill includes a log deck upon which logs 8 are deposited, as from a mill pond, preparatory to cutting. The log deck generally comprises the spaced deck skids 10, the cradle type stop and loaders 12 secured to the shaft 14, and the log loaders 16 secured to shaft 18. The shafts are driven by motor means (not shown) in manner well-known in the art.

Adjacent the forward end of the log deck and extending perpendicularly thereto is a pair of spaced parallel rails 20. A log carriage framework 22 is supported upon the rails by wheels 24, and is driven forwardly and rearwarly thereon by cables 26 and 28, respectively, each of which is secured at one end to the carriage framework and at the other end to a power winch (not shown).

Extending transversely of the carriage framework are spaced head blocks 30, upon which a log may be deposited from the log deck. An upstanding knee 32 is supported slidably upon each head block for longitudinal movement over the latter. The knees are connected to a power driven set shaft 34 by any conventional means such as lead screws or knee chains. The set shaft extends longitudinally of the carriage and is journaled in bearings supported by the head blocks and by the intermediate frame members of the carriage.

In the carriage assembly illustrated the set shaft is driven by means of an electric motor 36 mounted upon one of the transverse members of the carriage frame. The drive shaft of the electric motor is connected to an electrically actuated clutch 38, the output shaft of which is coupled to the input of a gear reduction unit 40 (not shown in Fig. 1). The output shaft of the gear reduction unit is coupled to the set shaft 34 by a chain 42 reeved over sprockets 44 mounted on said output shaft and set shaft, respectively.

A log is deposited upon the head blocks in abutment with the knees, and is secured releasably in that position by the retractable dogs 46 mounted in the knees. In this manner the log is rendered movable with the knees as the latter are actuated by rotation of the set shaft.

A power driven saw blade 48, of the band type or of the circular type illustrated, is arranged adjacent the forward rail in such manner as to clear the head blocks as the carriage is moved along the rails.

Preparatory to cutting a log, the set shaft assembly is activated to move the knees, and hence the log, forwardly, i.e. in the direction of the plane 50 of the saw blade, a distance sufficient to cause the log to intercept the plane of the saw blade to the extent required for making the desired cut. This controlled movement of the knees is effected by the selective rotation of the power driven set shaft 34, and it is this rotation of the set shaft that is regulated by setworks. The setworks illustrated in Figure 1 is of the remote control type, wherein control mechanism 52 is coupled mechanically through sprockets 54, 56 and chain 58 to the output shaft of the gear reduction unit 40, and electrically through flexible electric wires (not shown) to a control panel 60 located at the operator's station adjacent the saw. In the illustrated embodiment, the set shaft motor 36 and clutch 38 normally are deenergized. Accordingly, upon energization of the motor 36 and clutch 38, the output shaft of the clutch is coupled to the drive shaft of the set shaft motor, thus causing rotation of the set shaft and simultaneous movement of the knees with respect to the plane of the saw blade. When the knees have reached a desired position with respect to said saw plane, the clutch and associated set shaft motor are deenergized, whereupon the clutch shaft is uncoupled from the set shaft motor and rotation of the set shaft and movement of the knees and log are halted.

It will be understood that the clutch 38 may be omitted and the drive shaft of the motor 36 connected directly to the set shaft. In either case, since there generally is a lag between de-energization of the clutch or motor and complete stopping of the movement of the log, it has been a practice heretofore, to utilize an external braking system which functions upon the de-energization of the clutch or set shaft motor to bring the movable system rapidly to a halt. However, as mentioned earlier herein, such use of external braking systems has not been completely satisfactory, since a constant braking action does not overcome the aforementioned variables of friction and inertia accompanying the movement of logs of varying dimensions.

In accordance with the embodiment illustrated, there is associated with the output shaft of the electric clutch 38, an electric brake 62, preferably of the direct current variable torque type, arranged to apply braking torque directly to the clutch output shaft. The brake is connected to a source of direct current through an electric circuit which includes means for adjusting automatically the braking torque of the electric brake inversely with respect to the distance of the knees from the plane of the saw blade. A preferred mechanical and electrical arrangement providing this function is illustrated in Figure 2 of the drawing.

Mounted upon one of the transverse members of the carriage frame is a rheostat unit 64 which includes a resistance element 66 and an electrical contact element 68 mounted for rotation with a shaft 70 and arranged for sliding contact over the length of the resistance element. The shaft is coupled to the output shaft of a gear reducer 72, also mounted upon the frame member of a carriage, and the input shaft 74 of the gear reducer is connected through sprockets 76, 78 and chain 80 to the set shaft 34. The arrangement of the gear reducer is such that the electrical contact traverses the length of the resistance element between the limits of travel of the knees on the head blocks. These limits of movement of the knees are indicated in Figure 1 of the drawing by the position of the limit switches 82 and 84 mounted on the carriage and the contact arm 86 mounted on the knee for engagement therewith at the rearward and forward limits, respectively, of travel of the knees.

Referring now particularly to Figure 2 of the drawing, one terminal 88 of a source of direct current is connected through flexible conductor 90 to one terminal of the electric brake 62. The other terminal of the brake is connected through electrical conductor 92 to the rotary electrical contact 68 and to one end of the resistance element 66. The opposite end of the resistance element is connected through an electrical conductor 94 to one end of a second electrical resistance element 96 which preferably is positioned on the control panel 60 at the operator's station. A rotary electric contact element 98 associated with the second resistance element also is connected to electrical conductor 94 and is manipulated by the operator through a control knob 100, in conventional manner. The opposite end of the second resistance element 96 is connected through normally closed switches 102 and 104 to the second terminal 106 of the direct current supply.

The electric clutch 38 also is connected to the terminals 88 and 106 of the direct current supply through conductors 90 and 108, respectively, the latter through either of switches 102 and 104 when in their open positions.

The normally closed switch 102 is controlled by a relay 110 which is connected in parallel with a forward magnetic relay 112 to terminals 114 and 116 of an electric supply. The forward magnetic relay 112 controls the closing of the normally open contacts 118 in the electric circuit for driving the set shaft motor 36 in the direction for advancing the knees toward the saw line 50. A push button switch 120, and the safety limit switch 84, are interposed between said relays 110 and 112 and terminal 116. The push button switch 120 may function as a conventional jog switch, or it may be replaced by the remote control setworks assembly represented schematically in Figure 1 by the components 52, 60.

Normally closed switch 104 is controlled by relay 122 in parallel with the reverse magnetic relay 124. Push button switch 126, the limit switch 82, are interposed between said relays and terminal 116, as illustrated. The reverse magnetic relay 124 controls the closing of the normally open contacts 128 in the electric circuit for driving the set shaft motor in the direction for retracting the knees from the saw line. The three-phase electric supply for the set shaft motor is indicated by the terminals 130.

By the foregoing arrangement it will be understood that the brake 62 is energized, through switches 102 and 104, when the motor 36 is deenergized, and the brake is deenergized, by opening of either of the switches 102 or 104, when the associated relays 110 and 122 are energized simultaneously with the parallel relays 112 or 124 which control the reversible operation of the motor 36.

As stated hereinbefore, the electric contact 68 of the resistance element 66 is operable over the range of the latter between the limits of movement of the knees. The mechanical arrangement is such that when the knees are in the position of full retraction, with the contact arm 86 engaging the rearward limit switch 82, the contact element 68 is positioned at the end of the resistance element 66 which introduces maximum resistance to the direct current circuit of the brake 62. Similarly, when the knees are at the position of full extension, with the contact arm 86 engaging the forward limit switch 84, the electrical contact 68 is positioned at the opposite end of the resistant element 66 to introduce minimum resistance in the direct current circuit. This arrangement affords adjustment of the resistance in the direct current circuit of the electric brake automatically as the knees are moved between their extreme limits of travel, with the braking torque increasing progressively as the knees 32 move forward toward the plane 50 of the saw.

The second rheostat assembly, comprising resistance element 96 and electrical contact 98, functions as a trimmer which may be adjusted by the operator to compensate for variations in conditions which might occur over extended periods of operation. It has been found in practice that only infrequent adjustment of this rheostat is required.

The automatic adjustment of braking torque, as provided by this invention, operates effectively to compensate for variations of friction and inertia of the movable system of the carriage assembly, as logs of varying diameters are manipulated on the carriage. For example, it has been explained hereinbefore that with carriage systems employed heretofore, undersetting of large logs occurs as a result of substantial friction of the logs on the head blocks. Since larger logs necessarily require greater retraction of the knees from the plane of the saw blade, as compared with smaller logs, and since such retraction automatically adjusts the resistance of the direct current circuit of the brake to provide reduced braking torque, the braking action attending deenergization of the set shaft motor is less severe. This permits additional forward movement of the log, under its own inertia and the inertia of the set shaft assembly, to compensate for normal undersetting.

On the other hand, as log diameter decreases, the knees approach closer to the plane of the saw, and hence closer to their forward limit of extension. Simultaneously therewith, the resistance of the direct current circuit of the brake is adjusted automatically to increase the braking torque and thus counteract the force of inertia of the set shaft assembly, to prevent oversetting.

It is believed to be apparent that by the present invention novel means is afforded for adjusting the braking torque of an electric brake automatically in inverse proportion to a variable distance between relatively movable parts of a machine. The arrangement is such that the adjusting mechanism of this invention effectively measures the varying distance between said relatively movable parts and automatically adjusts the braking torque in relation thereto. The system is of extremely simplified construction, and is adaptable for use with machines of various types to provide a precision of control heretofore not available.

It will be apparent to those skilled in the art that various changes may be made in the details of construction described herein, without departing from the scope and spirit of this invention. For example, a linear rheostat may be substituted for the rotary rheostat illustrated, and may be driven directly by the linear movement of the knees, for example, or may be driven by the rotary set shaft through a conventional rack and pinion assembly. The rotary rheostat illustrated also may be driven directly by the linear movement of the knees through a rack and pinion assembly, or by other conventional drive means. It will also be understood that the manually adjustable rheostat assembly may be omitted if desired.

If the set shaft motor 36 is to be driven intermittently as the primary control of the set shaft, its drive shaft will be connected directly to the input of the gear reduction unit 40 and the electrical control circuit for the motor will be modified in well-known manner. Other electric circuit arrangements for the continuous drive system illustrated, also will be apparent.

The foregoing and other modifications may be made, as desired. Accordingly it is to be understood that the foregoing description is primarily illustrative of this invention and is not to be considered as limiting the scope thereof.

Having now described my invention and the manner in which the same may be used, what I claim as new and desire to secure by Letters Patent is:

1. For use in a system including power-driven variable load conveyor means adapted to be moved toward and away from a reference point, and a variable torque electric brake releasably engaging said conveyor means and having an electric circuit: means for varying the braking torque of the electric brake in inverse relationship with respect to the distance between said conveyor means and reference point, comprising variable resistance means in the circuit of the electric brake and having a movable member by which to vary said resistance, and a connecting means operatively interconnecting the conveyor means and said movable member of the resistance means for varying the magnitude of said resistance simultaneously with changes in and in inverse proportion to the distance between said conveyor means and reference point.

2. For use in a system including power-driven variable load conveyor means adapted to be moved toward and away from a reference point, and a variable torque brake releasably engaging said conveyor means: means for varying the braking torque of the brake in relation to the distance between said conveyor means and reference point, comprising torque control means operatively interconnecting the brake and conveyor means, the torque control means having a movable member by which to vary said torque, the movable member being connected to and operable by the conveyor means to vary the magnitude of braking torque substantially uniformly and simultaneously in inverse relationship with respect to changes in distance between said conveyor means and reference point.

References Cited in the file of this patent
UNITED STATES PATENTS

| | | |
|---|---|---|
| 853,585 | Hunt | May 14, 1907 |
| 1,353,401 | James | Sept. 21, 1920 |
| 2,117,912 | Santini | May 17, 1938 |
| 2,175,822 | Best | Oct. 10, 1939 |
| 2,342,967 | Peters | Feb. 29, 1944 |
| 2,696,853 | Balch et al. | Dec. 14, 1954 |
| 2,712,365 | Bruns | July 5, 1955 |
| 2,807,293 | Smith et al. | Sept. 24, 1957 |